July 5, 1966 S. BAYBICK ETAL 3,259,330
TAPE TRANSPORT
Filed April 1, 1964 2 Sheets-Sheet 1

INVENTORS
SOLOMON BAYBICK &
ROBERT H. JENKINS
BY Carl V. Olson
Attorney

INVENTORS
SOLOMON BAYBICK, &
ROBERT H. JENKINS
BY Carl V. Olson
Attorney

United States Patent Office 3,259,330
Patented July 5, 1966

3,259,330
TAPE TRANSPORT

Solomon Baybick, Riverton, and Robert H. Jenkins, Audubon, N.J., assignors to Radio Corporation of America, a corporation of Delaware
Filed Apr. 1, 1964, Ser. No. 356,409
4 Claims. (Cl. 242—55.12)

Figure 1:
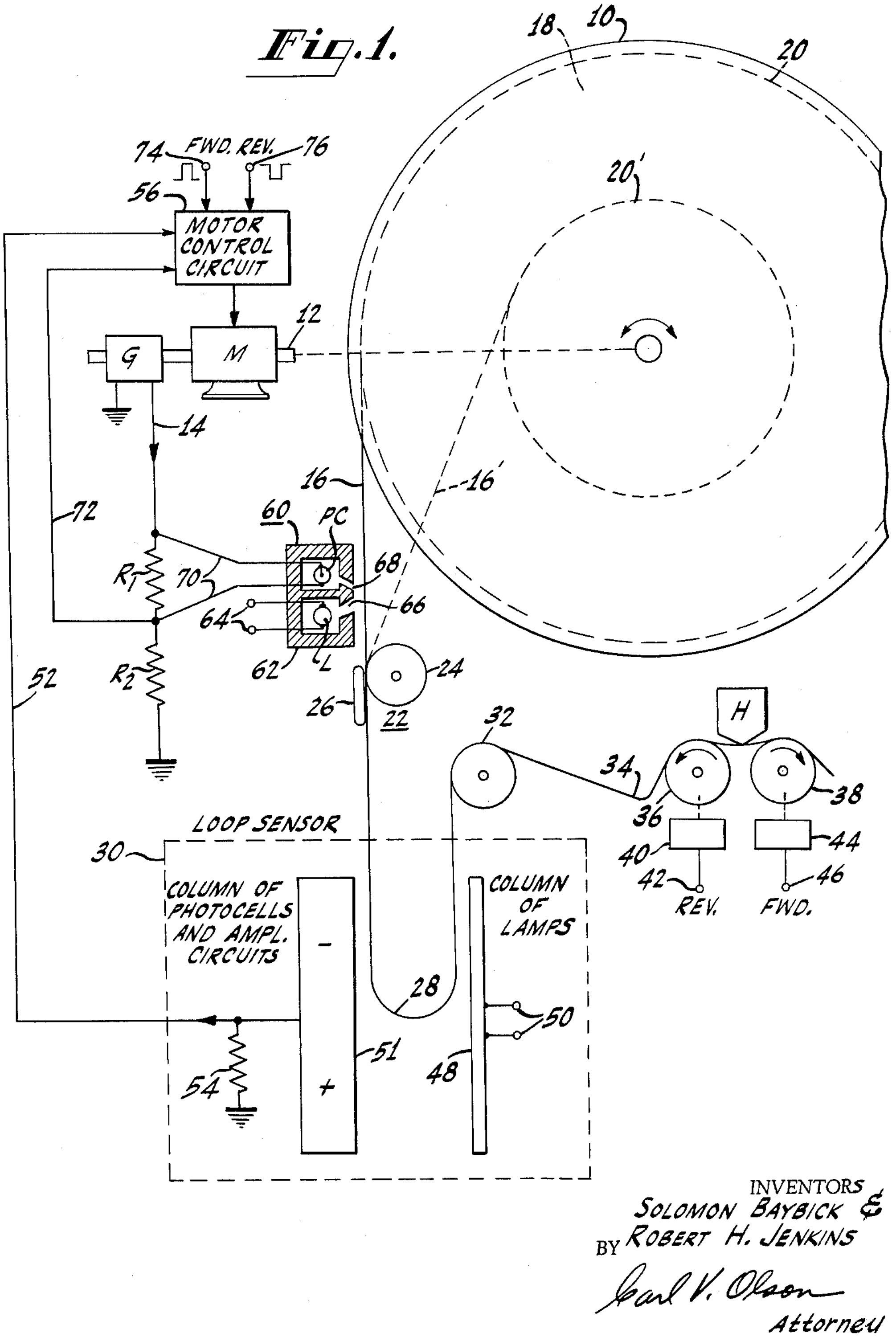

The present invention relates to tape transports, and particularly to systems for driving the supply and take-up reels of magnetic tape recorders and reproducers.

In a typical magnetic tape transport, forward and reverhe capstans drive the tape past an intermediate recording and reproducing head. The capstans are capable of very rapid acceleration, deceleration and reversal of the portion of the tape which extends between two reservoir loops. Motors which drive the tape supply and take-up reels cannot act so abruptly because of the inertia of the reels and the tape wound thereon. The electric power supplied to the reel motors is controlled by a servo system to maintain the physical sizes of the tape reservoir loops within a limited range.

It is an object of this invention to provide an improved servo system for driving tape reels so as to more smoothly and effectively maintain the tape reservoir loops within a predetermined size range.

It is another object to provide an improved system for driving tape reels wherein the electric power supplied to the reel motors is varied in accordance with the varying sizes of the tape packs wound on the tape reels.

It is a further object to provide an improved sensor of the amount of tape wound on a reel which is simple and reliable, which is physically compact, which does not interfere with the placement and removal of tape reels and which does not involve a physical abrading contact with the moving magnetic tape.

In accordance with an example of the invention, there is provided a magnetic tape transport including a tape reel, a tachometer generator, and a motor coupled to drive the reel and the tachometer generator. A tape is wound in pack on the reel, from which the tape extends tangentially from the periphery of the pack to and through a tape guide to a reservoir loop of tape. A photoelectric assembly is mounted near the tape path between the tape guide and the reel. The assembly includes a source of light directed to a surface of the tape and a photocell mounted to receive amounts of light reflected from the tape which vary in accordance with the angle at which the tape extends between the tape guide and the periphery of the tape pack on the reel. A motor control circuit is connected to supply a controllable electric driving power to the motor. Coupling means apply the output voltage of the tachometer generator to the motor control circuit to reduce the electric power supplied to the motor in accordance with the speed of the motor and generator. The photocell is connected to the coupling means to further vary the tachometer generator output voltage coupled to the motor control circuit in accordance with the diameter of the tape pack on the tape reel.

Figure 2:
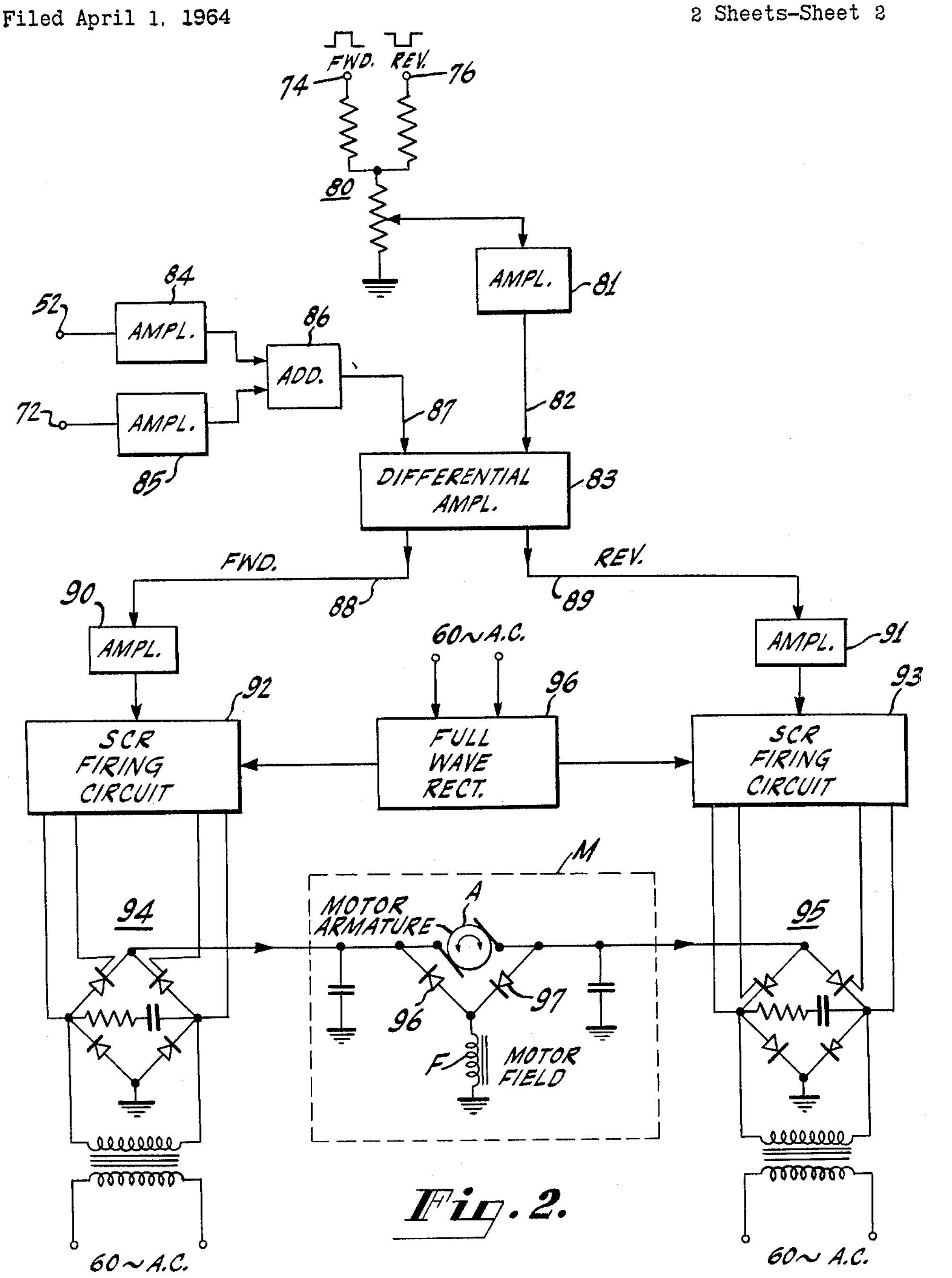

In the drawings:

FIG. 1 is a diagrammatic representation of a tape transport constructed according to the teachings of the invention; and FIG. 2 is a more detailed diagram of the motor and the motor control circuit included in the system of FIG. 1.

Referring to FIG. 1, there is shown a tape reel 10 which is directly connected to the shaft 12 of a reel motor M. The motor M is also directly connected to drive a tachometer generator G which provides an output voltage at 14 having a polarity determined by the direction of rotation of the motor and having an amplitude in accordance with the speed of rotation of the motor M.

Magnetic tape 16 is wound in a pack 18 on the reel 10. When the reel 10 is full, the tape 16 extends tangentially from the periphery 20 of the pack to a tape guide 22 which includes an idler roller 24 and a guide strip 26. When the reel 10 is nearly empty, the periphery of the pack is at 20' and the tape extends tangentially along the path 16' to the tape guide 22. The tape 16 then extends in the form of a tape reservoir loop 28 located in a loop sensor 30. Beyond the loop 28, the tape extends over an idler roller 32 through a vacuum tension loop 34, over a reversing capstan 36, past a magnetic head H and over a forward capstan 38. The head H is between two similar tape handling arrangements only the left-side one of which is shown in FIG. 1.

The capstans 36 and 38 are continuously driven in opposite directions by motors not shown. The reverse capstan 36 is made to grip and drive the tape by means of a vacuum device 40 operated in response to an electric signal applied to the terminal 42. Likewise, the forward capstan 38 is made to grip and drive the tape in response to a vacuum device 44 operated in response to an electric signal applied to the terminal 46.

The loop sensor 30 is a known device including a column 48 of light sources electrically energized from terminals 50, and a corresponding column 51 of photocells with individual amplifier circuits having their outputs connected in common at 52 across an output resistor 54. The output signal on line 52 from the loop sensor 30 may have one polarity (—) when the loop 28 is above the position shown and may have the opposite polarity (+) when the loop 28 extends below the position shown. Furthermore, the amplitude of the output signal varies in accordance with how far the loop 28 is from the median position shown. The output of loop sensor 30 is applied over line 52 to a motor control circuit 56.

A photoelectric assembly 60 is mounted near the path taken by the tape 16 between the reel 10 and the tape guide 22. The photoelectric assembly 60 is preferably located very near the tape guide 22 so that the assembly may be very compactly constructed and so that it will not interfere with the mounting and removal of the reel, and the threading of the tape.

The photoelectric assembly 60 includes a housing 62, shown in section, having two separated chambers. One chamber is provided with a light source or lamp L supplied with electricity from terminals 64. The other chamber contains a photocell PC which may be of the type providing a resistance varying inversely with the amount of light impinging thereon. The photocell may be a cadmium sulfide or cadmium selenide cell, and may be the Type CL 403 cell sold by Clairex Corporation, New York, N.Y. The housing 62 has an aperture 66 through which light from the source L is directed to the surface of the magnetic tape 16, and the housing has an aperture 68 through which light reflected from the magnetic tape can reach the photocell PC.

The geometry and placement of the housing 62 is designed so that a maximum amount of light is reflected from the source L to the photocell PC when the tape lies at the angle of tape 16, and a minimum amount of light is reflected to the photocell PC when the tape lies at the angle of tape 16'. Furthermore, the variation on the amount of light reflected to the photocell PC varies continuously between the maximum and minimum extremes. The variation in the amount of light reaching the photocell is due to a variation in both the angle of the tape with relation to the assembly 60 and the distance of the tape from the assembly 60.

The terminals of the photoelectric cell PC are connected over leads 70 to the terminals of a resistor $R_1$ which, together with a resistor $R_2$, forms a voltage divider output coupling circuit for the output 14 of tachometer generator G. The midpoint between resistors $R_1$ and $R_2$ is connected over line 72 to a control input of the motor control circuit 56. To give an illustrative example, the photocell PC may have a standard photoresistor unit which varies in resistance between five thousand ohms when a maximum amount of light is reflected to it from the tape in position 16, to a resistance of sixty thousand ohms when a minimum amount of light is reflected to it from the magnetic tape at position 16′. Resistor $R_1$ may have a value of thirty thousand ohms, and resistor $R_2$ may have a value of twenty thousand ohms. With the values of resistance recited, the voltage on output line 72 may vary in a 1-to-2 range from about forty percent to about eighty percent of the voltage supplied from the output 14 of tachometer generator G, depending on whether the tape reel 10 is full or empty, respectively. The diameter of the tape pack on reel 10 varies in a 1-to-2 range between full and empty conditions.

Reference is now made to FIG. 2 for a description of the motor control circuit 56 of FIG. 1. The forward and reverse terminals 74 and 76 are connected through a resistor network 80 and an amplifier 81 to one input 82 of a differential amplifier 83. The input lines or terminals 52 and 72 are connected through respective amplifiers 84 and 85 and through an adder circuit 86 to the other input 87 of the differential amplifier 83. The differential amplifier 83 may, for example, be constituted by a symmetrical circuit including two transistors having a common emitter resistor. The two input terminals 87 and 82 of the differential amplifier are coupled to base electrodes of the respective transistors. Two outputs 88 and 89 with respect to ground are taken from the collector electrodes of the two transistors. The two output signals provided are always of opposite polarities with reference to a zero-signal value such as −20 volts, and both have an amplitude with reference to the zero-signal value determined by the algebraic difference in amplitude between the two signals applied to the two input terminals of the amplifier.

Forward and reverse outputs 88 and 89, respectively, from the differential amplifier 83 are coupled through respective amplifiers 90, 91, respective silicon controlled rectifier (SCR) firing circuits 92, 93, to respective rectifier networks 94, 95. The amplifiers 90 and 91 are biased so that they respectively respond solely to signals above the zero-signal value, and to signals below the zero-signal value. The firing circuits 92 and 93 and the rectifier networks 94, 95 are synchronized by outputs of a full wave rectifier 96. The synchronous SCR firing circuits 92 and 93 may be designed in accordance with the techniques described in the Silicon Controlled Rectifier Manual (second edition), published by General Electric Company, Rectifier Conmponents Department, W. Genesee Street, Auburn, New York.

The motor M is a reversible direct current motor of the series type provided with a pair of current steering diodes 96 and 97 connected in series across the armature A of the motor with a midpoint connected to the field winding F of the motor. When the forward diode network 94 is energized by the forward firing circuit 92, it supplies a current flowing through the motor armature A, the diode 97 and the motor field F to ground to cause the motor to operate in the forward direction. Conversely, when the diode network 95 is energized by the reverse firing circuit 93, a current flows from ground in the reverse direction through the motor field F, through the diode 96 and in the same direction through the motor armature A to the diode network 95 to cause the motor to rotate in the reverse direction. The firing circuits 92 and 93 control the amounts of current supplied to the motor M from the respective diode networks 94 and 95 in accordance with the amplitudes of respective signals applied to the firing circuits from the respective outputs of the differential amplifier 83.

To summarize, an output signal on forward output lead 88 from the differential amplifier 83 causes the motor M to rotate in the forward direction at a speed determined by the amplitude of the signal. Similarly, an output signal on reverse output lead 89 from the differential amplifier 83 causes the motor M to rotate in the reverse direction at a speed determined by the amplitude of the signal.

In the operation of the tape transport system shown in FIGS. 1 and 2, a forward signal applied to the terminal 46 of the capstan means 38, 44 causes an immediate forward motion of the tape 16 past the head H. A forward signal applied at the same time to the forward terminal 74 of the motor control circuit 56 causes a forward output signal on lead 88 from the differential amplifier 83 which causes the reel motor M to rotate in the forward (counterclockwise) direction. The initial signal on lead 88 from the differential amplifier 83 is large, and the current supplied to the motor is large, until the motor M increases sufficiently in speed to cause a correspondingly increased signal from the tachometer generator G. The generator output signal is supplied through lead 72, amplifier 85 and adder 86 to the other input 87 of the differential amplifier 83 where it acts to reduce the forward output signal from the amplifier. The initial forward signal from the differential amplifier 83 is also intially large because the capstan 38 almost instantly shortens the tape reservoir loop 28 and causes a negative signal from the loop sensor 30 through lead 52, amplifier 84, and adder 86 to the input 87 of the differential amplifier in a polarity to increase the forward output signal from the differential amplifier.

After the tape reel motor M reaches an equilibrium speed, the position of the tape reservoir loop 28 is stabilized and the output of the tachometer generator G reduces the forward current to the motor M to the amount required for the normal operating speed. The damping signal from the tachometer generator G which opposes the forward signal in the motor control circuit has a value which is influenced through the photoelectric assembly 60 by the size of the tape pack on the reel 10. When the tape reel 10 is full and the tape is at the position 16, a large amount of light is reflected to the photocell PC and the resulting low resistance of the cell shunted across the resistor $R_1$ causes a maximum proportion of the output of the tachometer generator G to appear across the resistor $R_2$ and be applied over line 72 as a damping or speed-reducing signal to the motor control circuit. On the other hand, if the tape pack is almost empty and the tape is at position 16′, very little light is reflected from the tape to the photocell PC. The resistance of the photocell is then high and a smaller proportion of the voltage generated by the tachometer generator G is applied over lead 72 as a damping or speed-reducing signal. Stated another way, the photoelectric unit 60 acts on the output coupling circuit of the tachometer generator, and through the motor control circuit, to cause the tape reel motor M to run in a speed inversely related to the amount of tape on the reel.

The operation of the system when reverse signals are applied to terminals 42 and 76 is similar to the operation which has been described. The reverse signal applied to terminal 76 has the opposite polarity compared with the forward signal and it causes the motor M to run in the reverse direction. The tachometer generator G, when driven in the reverse direction, generates an output signal having an opposite polarity compared with the forward direction, and it acts to damp or reduce the effect of the opposite polarity reverse signal applied to the differential amplifier. The polarities of the signals from the loop sensor 30 are in the right direction to maintain the tape loop 28 near the middle of its range. A tape transport will normally have another right-side system, similar to the left-side system shown in FIG. 1, for the other left-side tape reel. The right-side system is the same as the left-side system shown except for obvious differences in polarities and directions of rotation.

From the foregoing it is seen that the invention provides an improved tape transport servo system wherein the speed of the tape reel motor is influenced by a photoelectric means in accordance with the instantaneous diameter of the tape pack on the tape reel.

What is claimed is:

1. In a magnetic tape transport, the combination of
a tape reel, a tachometer generator, and a motor coupled to drive said reel and said tachometer generator,
a tape guide spaced from said tape reel,
a tape wound in a pack on said reel and extending tangentially from the periphery of the pack to and through said tape guide,
a photoelectric assembly mounted near the tape path between said guide and said reel, said assembly including a source of light directed to a surface of said tape and a photocell mounted to receive amounts of the light reflected from said tape which vary in accordance with the angle at which the tape extends between the tape guide and the periphery of the tape pack on the reel, and
circuit means to utilize the output of said tachometer generator and said photocell to control the amount of electric power supplied to said motor.

2. In a magnetic tape transport, the combination of
a tape reel, a tachometer generator, and a motor coupled to drive said reel and said tachometer generator,
a tape guide spaced from said tape reel,
a tape wound in a pack on said reel and extending tangentially from the periphery of the pack to and through said tape guide to a reservoir loop of tape,
a photoelectric assembly mounted near the tape path between said guide and said reel, said assembly including a source of light directed to a surface of said tape and a photocell mounted to receive amounts of the light reflected from said tape which vary in accordance with the angle at which the tape extends between the tape guide and the periphery of the tape pack on the reel,
a motor control circuit connected to supply a controllable electric driving power to said motor,
coupling means to apply the output voltage of said tachometer generator to said motor control circuit to reduce the electric power supplied to said motor in accordance with the speed of the motor and generator, and
means connecting said photocell to said coupling means to vary the tachometer generator output voltage coupled to said motor control circuit in accordance with the diameter of the tape pack on said tape reel.

3. In a magnetic tape transport, the combination of
a tape reel, a tachometer generator, and a motor coupled to drive said reel and said tachometer generator,
a tape guide spaced from said tape reel,
a tape wound in a pack on said reel and extending tangentially from the periphery of the pack to and through said tape guide to a reservoir loop of tape,
a photoelectric assembly mounted near the tape path between said guide and said reel, said assembly including a source of light directed to a surface of said tape and a photocell mounted to receive amounts of the light reflected from said tape which vary in accordance with the angle at which the tape extends between the tape guide and the periphery of the tape pack on the reel,
a motor control circuit connected to supply a controllable electric driving power to said motor,
coupling means to apply the output voltage of said tachometer generator to said motor control circuit to reduce the electric power supplied to said motor in accordance with the speed of the motor and the generator,
means connecting said photocell to said coupling means to vary the tachometer generator output voltage coupled to said motor control circuit in accordance with the diameter of the tape pack on said tape reel, and
tape reservoir loop sensing means having an electrical output coupled to said motor control circuit to vary the electric power supplied to said motor in accordance with the size of the tape loop.

4. In a magnetic tape transport, the combination of
a tape reel, a tachometer generator, and a reel motor coupled to drive said reel and said tachometer generator,
a tape guide spaced from said tape reel,
capstan means for driving tape past a magnetic head,
a tape wound in a pack on said reel and extending tangentially from the periphery of the pack through said tape guide, and through a reservoir loop of tape to said capstan means,
a photoelectric assembly mounted near the tape path between said guide and said reel, said assembly including a source of light directed to a surface of said tape and a photocell mounted to receive amounts of the light reflected from said tape which vary in accordance with the angle at which the tape extends between the tape guide and the periphery of the tape pack on the reel,
a reel motor control circuit,
means to simultaneously supply electric current to said capstan means and through said reel motor control circuit to said reel motor,
coupling means to apply the output voltage of said tachometer generator to said reel motor control circuit to reduce the electric power supplied to said reel motor in accordance with the speed of the reel motor and generator, and
means connecting said photocell to said coupling means to vary the tachometer generator output voltage coupled to said reel motor control circuit in accordance with the diameter of the tape pack on said tape reel.

References Cited by the Examiner

UNITED STATES PATENTS

| | | | |
|---|---|---|---|
| 2,926,860 | 3/1960 | Pomarico | 242—55.12 |
| 3,065,355 | 11/1962 | Barnes | 242—55.12 X |
| 3,109,604 | 11/1963 | Brenner | 242—55.14 |

LEONARD D. CHRISTIAN, *Examiner.*

MERVIN STEIN, *Primary Examiner.*